US006497245B1

(12) United States Patent
Torii

(10) Patent No.: US 6,497,245 B1
(45) Date of Patent: Dec. 24, 2002

(54) INTAKE AIR CONTROLLER FOR INTERNAL COMBUSTION ENGINE AND MANUFACTURING THE SAME

(75) Inventor: Katsuya Torii, Anjo (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/685,562

(22) Filed: Oct. 11, 2000

(30) Foreign Application Priority Data

Oct. 13, 1999 (JP) .......................................... 11-290457

(51) Int. Cl.[7] .......................... F16K 5/00; F16K 31/04

(52) U.S. Cl. ............... 137/315.11; 123/337; 137/15.25; 137/315.23; 137/315.24; 137/454.6; 251/306; 251/308; 251/367

(58) Field of Search ......................... 137/15.25, 315.22, 137/315.23, 315.25, 315.26, 454.6, 454.2, 315.24; 123/337, 339.15, 399, 339.14; 251/305, 306, 307, 308, 366, 367

(56) References Cited

U.S. PATENT DOCUMENTS 2,655,942 A * 10/1953 Dougherty .................. 251/305
2,751,186 A * 6/1956 Glur ........................... 251/305
2,902,254 A * 9/1959 Conway et al. ............. 251/305
2,936,778 A * 5/1960 Stillwagon ............... 137/454.6
3,086,544 A * 4/1963 Yost ........................... 251/367
3,300,137 A * 1/1967 Murphy ...................... 251/305
3,648,723 A * 3/1972 Nelson et al. ........... 137/454.6
3,771,545 A * 11/1973 Allen ......................... 251/174
3,862,740 A * 1/1975 Gallagher et al. .......... 251/305
4,047,275 A * 9/1977 Bake et al. ................. 251/366
4,181,288 A * 1/1980 Bylsma ...................... 251/305
4,254,938 A * 3/1981 Inada et al. ................. 251/367
4,270,559 A * 6/1981 Wallberg .................... 251/305
4,332,271 A 6/1982 Rohr .......................... 251/305
4,534,538 A * 8/1985 Buckley et al. .......... 137/454.6
4,557,288 A * 12/1985 Botnick ................... 137/454.6
4,562,860 A * 1/1986 Walter et al. ............ 137/454.6
4,606,368 A * 8/1986 McCafferty .............. 137/454.2
5,005,545 A 4/1991 Wendel et al. .............. 123/337
5,076,540 A * 12/1991 Murphy ................. 137/315.25
5,169,121 A * 12/1992 Blanco et al. .............. 251/305
5,181,692 A * 1/1993 Brausfeld ................... 251/367
5,341,773 A 8/1994 Schulte et al. ......... 123/184.61
5,342,019 A * 8/1994 Braun et al. ................ 251/305
5,343,841 A 9/1994 Hattori et al. ........... 137/454.6
5,402,022 A 3/1995 Bertolini ...................... 310/37
5,458,148 A * 10/1995 Zelczer et al. ........... 137/15.25
5,462,080 A * 10/1995 Plavidal et al. ............. 137/337
5,593,131 A * 1/1997 Briggs, Jr. et al. .......... 251/305
5,839,471 A * 11/1998 Yang .......................... 251/367
5,881,757 A * 3/1999 Kuster et al. ............... 251/367
6,170,461 B1 * 1/2001 Pursifull ..................... 123/337

FOREIGN PATENT DOCUMENTS

DE 19803356 8/1999
JP U-2-144629 2/1990
JP 10103089 4/1998

* cited by examiner

*Primary Examiner*—George L. Walton
(74) *Attorney, Agent, or Firm*—Nixon & Vanderhye PC

(57) ABSTRACT

A throttle assembly including a bore wall to which a seal member is previously attached is inserted into a key-like slot of an intake air passage body, and flanges are fixed to each other by screws. A bore inner wall of the bore wall is placed to correspond to an inner wall of an intake air passage, and the seal member completely seals between the intake air passage body and the throttle assembly. That is, the throttle assembly including the seal member is inserted into the key-like slot, so that the throttle assembly is easily attached to the intake air passage body, a sealing mechanism therebetween is simplified, and a stress strain of the bore wall is prevented.

7 Claims, 9 Drawing Sheets

INTAKE AIR CONTROLLER FOR INTERNAL COMBUSTION ENGINE AND MANUFACTURING THE SAME

CROSS REFERENCE TO RELATED APPLICATION

This application is based on and incorporates herein by reference Japanese Patent Application Nos. Hei. 11-290457 filed on Oct. 13, 1999, and 2000-303938 filed on Oct. 3, 2000.

BACKGROUND OF THE INVENTION

1. Field of the Invention

The present invention relates to an intake air controller suitable for use in an internal combustion engine, to which a throttle assembly including a throttle valve is attached 2. Description of Related Art U.S. Pat. No. 5,341,773 discloses an intake air controller for an internal combustion engine, to which a throttle assembly including a throttle valve is attached. The throttle assembly made of resin is attached to intake air passages of the intake air controller. A sealing mechanism between the throttle assembly and the intake air passages includes O-rings axially sealing therebetween and a U-shaped pin preventing the throttle assembly from separating from the intake air passage.

However, according to U.S. Pat. No. 5,341,773, since the throttle assembly is disposed between the intake air passages, both ends of the throttle assembly have to be sealed. Thus, the throttle assembly is not easily attached to the intake passages, and the sealing mechanism is complicated to prevent a stress strain.

SUMMARY OF THE INVENTION

An object of the present invention is to provide an intake air controller in which a throttle body is easily attached to an intake air passage body, a sealing mechanism therebetween is simplified, and stress strain due to fixing force is prevented.

According to a first aspect of the present invention, a throttle assembly to which a seal member is previously attached is inserted into a slot, and first and second flanges are fixed to each other. That is, the throttle assembly including the seal member is inserted into the slot, so that the throttle assembly is easily attached to the intake air passage body, and a sealing mechanism therebetween is simplified.

According to a second aspect of the present invention, a first flange formed in the throttle body is fixed to a second flange formed in the intake air passage body by a screw, a snap fit, or a spring cramp. Thus, a sealing performance is improved and a bore wall is not distorted due to the fixing force, so that a throttle valve smoothly operates to attain an appropriate clearance between the throttle valve and the bore wall, thereby improving the control of the intake air flow amount.

According to a third aspect of the present invention, since an additional insertion portion is installed into and held by a holder portion while no seal member is provided therebetween, the axis of the insertion portion is made to correspond to the axis of the holder portion. Thus, a clearance between the outer wall of the insertion portion and the inner wall of the slot is constantly maintained, so that the sealing performance of the seal member is highly improved.

Further, the insertion portion is firmly supported by the holder portion, thereby preventing the insertion portion from vibrating due to an engine vibration.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
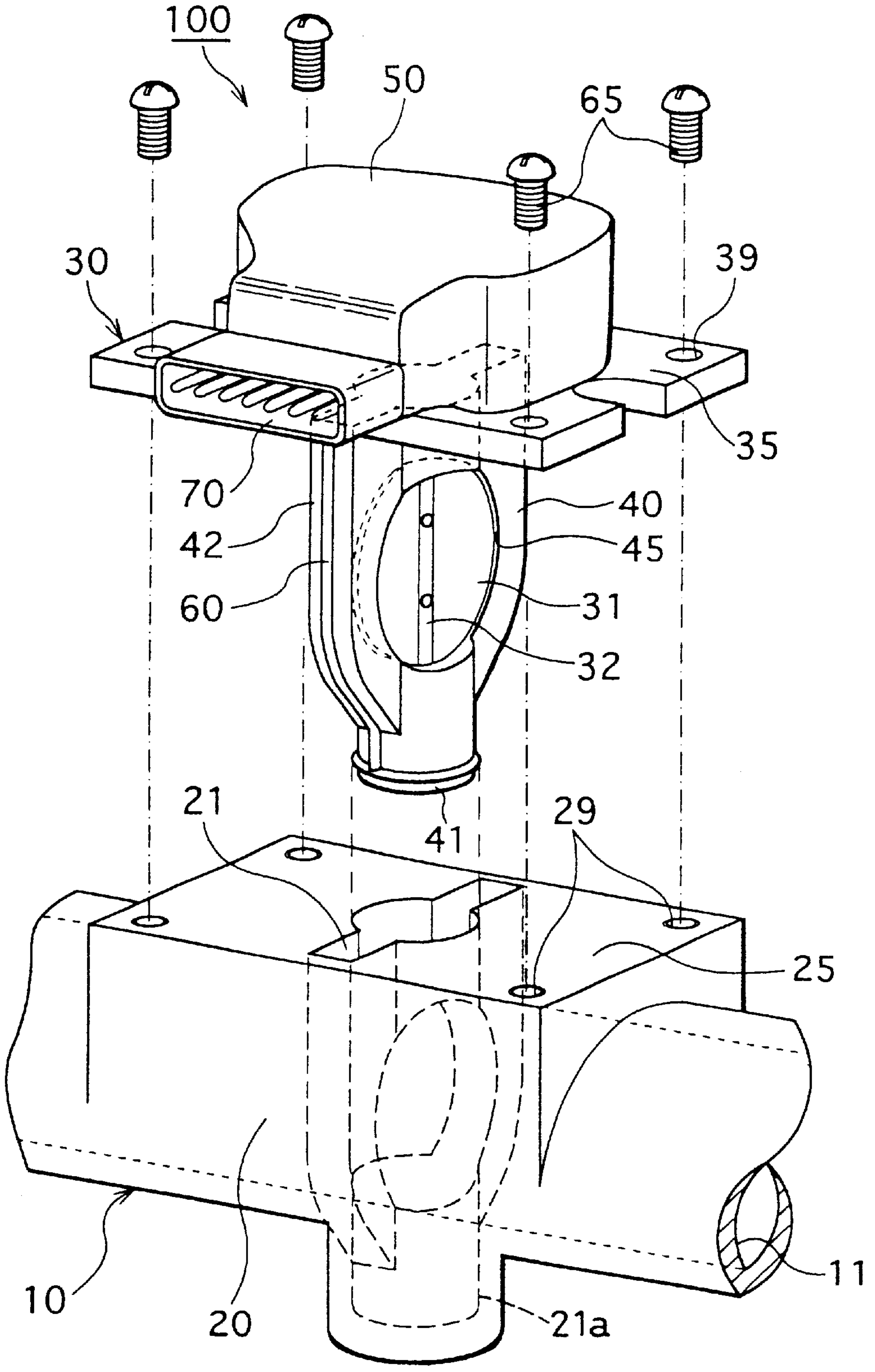
FIG. 1 is a perspective view showing an intake air passage body and a throttle assembly (first embodiment)

In the first embodiment, as shown in FIG. 1, an intake air controller 100 is used for an internal combustion engine, and includes an intake air passage body 20 and a throttle assembly 30. The intake air passage body 20 is formed within an intake air passage block 10 including an air passage 11. The intake air passage body 20 is made of resin, and the throttle assembly 30 is attached to the intake air passage body 20.

The intake air passage body 20 includes a key-like slot 21 and a flange 25. The key-like slot 21 is perpendicularly formed to an air-flow direction in the air passage 11, and the flange 25 is formed around the key-like slot 21. The key-like slot 21 includes a cylindrical hole 21*a* at the bottom thereof. The throttle assembly 30 includes a throttle valve 31, a bore wall 40 made of resin, a throttle shaft 32, a motor chamber 50, and a flange 35. The throttle valve 31 adjusts an amount of intake air flowing into the engine. The throttle shaft 32 supports the throttle valve 31 with respect to the bore wall 40. The motor chamber 50 contains an electric motor (not illustrated) and a throttle position sensor (not illustrated). The electric motor is connected to the throttle shaft 32 and drives the throttle valve 31. The throttle position sensor detects an actual opening position of the throttle valve 31. The flange 35 is to be attached to the flange 25 of the intake air passage body 20.

Figure 2:
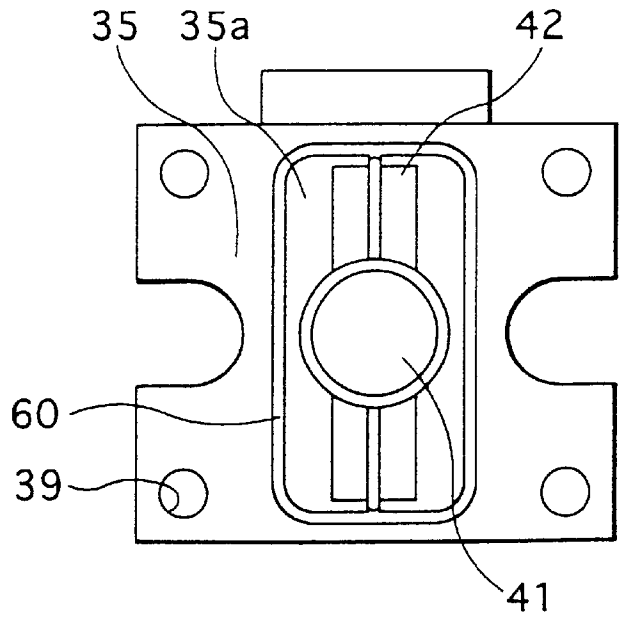
FIG. 2 is a bottom view showing the throttle assembly (first embodiment)

The bore wall 40 defines a cylindrical portion 41 and a side wall 42, and the flange 35 defines a root portion 35*a* where the bore wall 42 protrudes. As shown in FIGS. 1 and 2, a single rubber seal member 60 is provided at the cylindrical portion 41, side wall 42, and the root portion 35*a* of the flange 35.

An assembly procedure of the intake air controller 100 of the present embodiment will be explained with reference to FIGS. 1 and 2.

The bore wall 40 including the cylindrical portion 41 and the side wall 42 is inserted into the key-like slot 21 of the flange 25 perpendicularly to the intake air-flow direction. At this time, a return spring urges the throttle valve 31 at the original position thereof, so that the throttle valve 31 is entirely placed within the bore wall 40 in the air-flow direction. Thus, when the bore wall 40 is being inserted into the key-like slot 21, the edge of the throttle valve 31 does not contact the inner surface of the key-like slot 21. When the bore wall 40 is completely inserted into the key-like slot 21 and the cylindrical portion 41 is inserted into the cylindrical hole 21*a,* the seal member 60 is located between the cylindrical portion 41, the side wall 42 and the inner surface of the key-like slot 21, and is located between the root portion 35*a* and the top surface of the flange 25 of the intake air passage body 20.

The flange 35 of the throttle assembly 30 includes four screw holes 39, and the flange 25 of the intake air passage body 20 also includes four screw holes 29. Screws 65 fix the flange 35 of the throttle assembly 30 to the flange 25 of the intake air passage body 20 through the screw holes 29, 39. In this way, a bore inner wall 45 of the bore wall 40 is placed to correspond to the inner wall of the intake air passage 11, and the seal member 60 completely seals between the intake air passage body 20 and the throttle assembly 30.

After that, the electric motor and the throttle position sensor are electrically connected to an outside control unit through a connector 70 and a wire harness. The intake air amount into the engine is adjusted based on the opening position of the throttle valve 31 with respect to the bore inner wall 45.

As described above, the bore wall 40 to which the seal member 60 is previously attached is inserted into the key-like slot 21. That is, the throttle assembly 20 including the seal member 60 is inserted into the key-like slot 21 perpendicularly to the air-flow direction in the intake air passage 11, so that the throttle assembly 30 is easily attached to the intake air passage body 20, and a sealing mechanism therebetween is simplified.

Further, in the present embodiment, the screws 65 fix the 35 to the flange 25 at positions far from the throttle vale 31 and the bore wall 40. Thus, the flange 35 is easily fixed to the flange 25, and the bore inner wall 45 is not distorted due to the fixing force, so that the bore radius of the bore inner wall 45 is accurately maintained.

Thus, the electric motor smoothly operates the throttle valve 31 to attain an appropriate clearance between the throttle valve 31 and the bore inner wall 45, thereby improving the control of the intake air flow amount.

In the above-described first embodiment, the flange 35 of the throttle assembly 30 is fixed to the flange 25 of the intake air passage body 20 by the screws 65. Alternatively, the flange 35 may be fixed to the flange 25 by a snap fit or a spring cramp.

Figure 3:
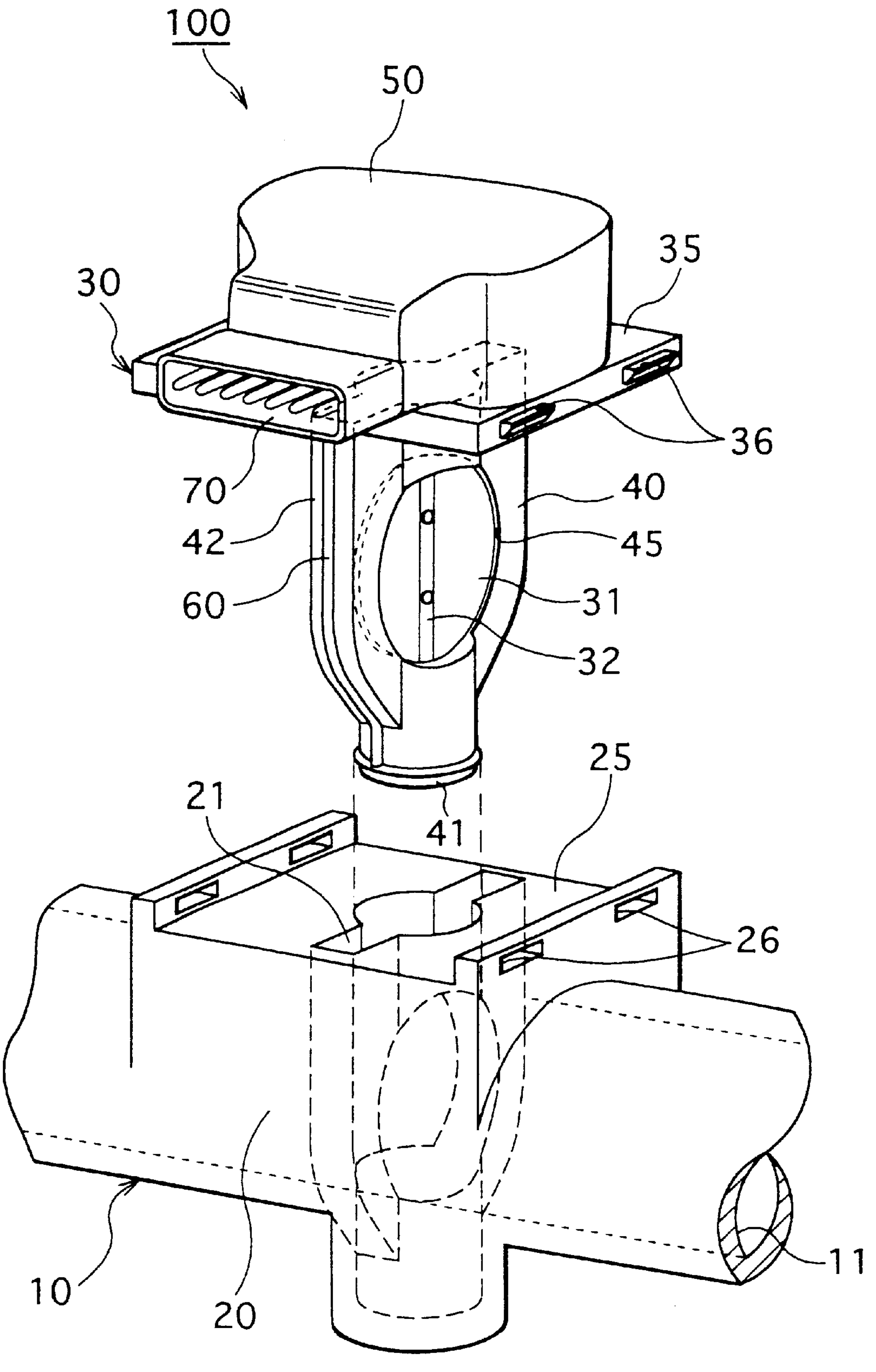
FIG. 3 is a perspective view showing an intake air passage body and a throttle assembly of first modification (first embodiment)

As shown in FIG. 3, the flange 35 is fixed to the flange 25 by a snap fit. The snap fit includes concave portions 26 formed within the flange 25, and projections 36 formed within the flange 35. Each projection 36 is inserted into each concave portion 26 to fix the flange 35 to the flange 25.

Figure 4:
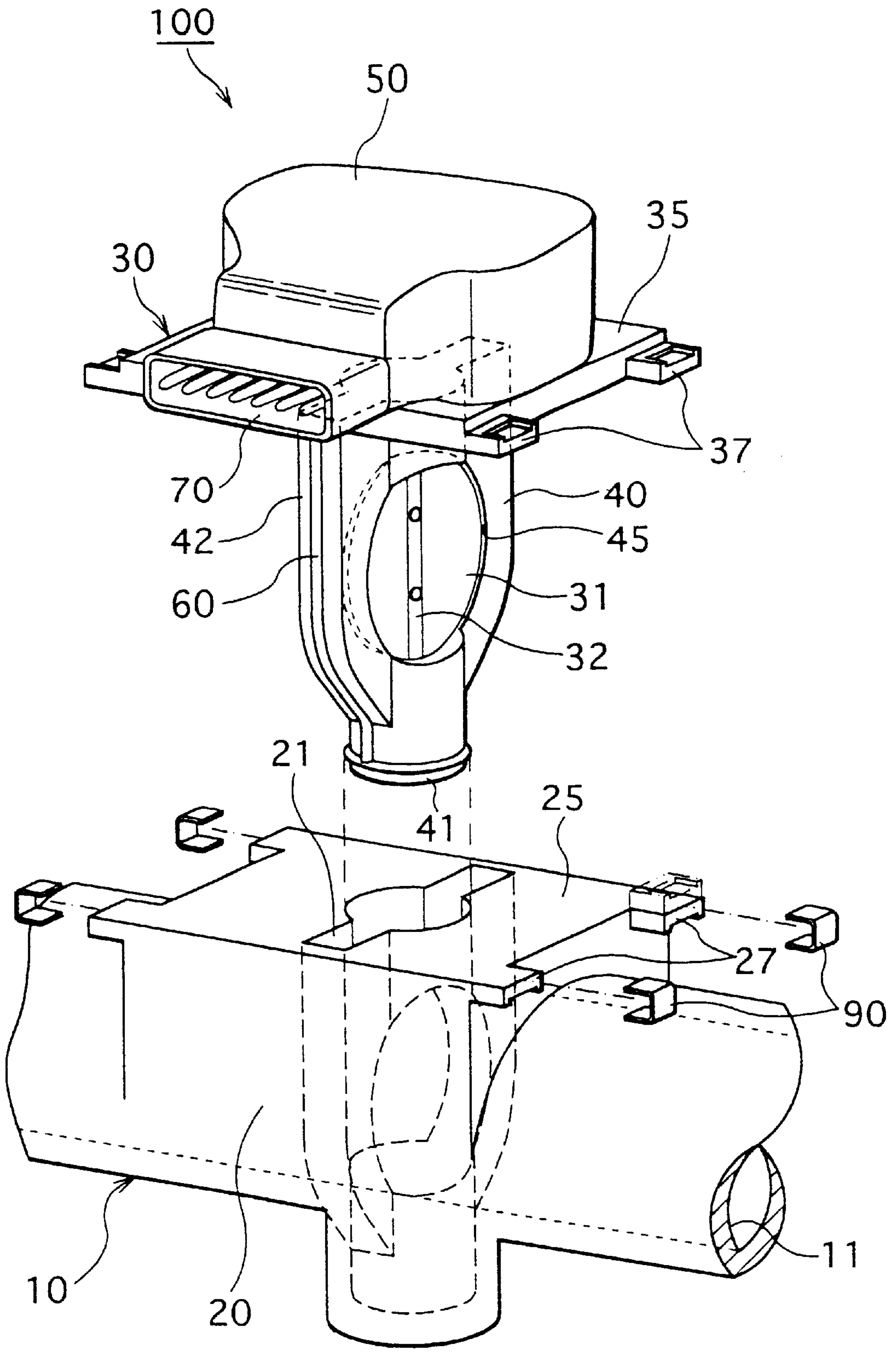
FIG. 4 is a perspective view showing an intake air passage body and a throttle assembly of second modification (first embodiment)

As shown in FIG. 4, the flange 35 of the throttle assembly 30 is fixed to the flange 25 of the intake air passage body 20 by spring cramps 90. The flange 25 includes four extending corners 27, and the flange 35 also includes four extending corners 37. The extending corners 27 and 37 are put together, and the spring cramps 90 are fit to cover both extending corners 27 and 37 while being elastically transformed, so that the flange 35 is fixed to the flange 25.

(Second Embodiment)

Figure 5:
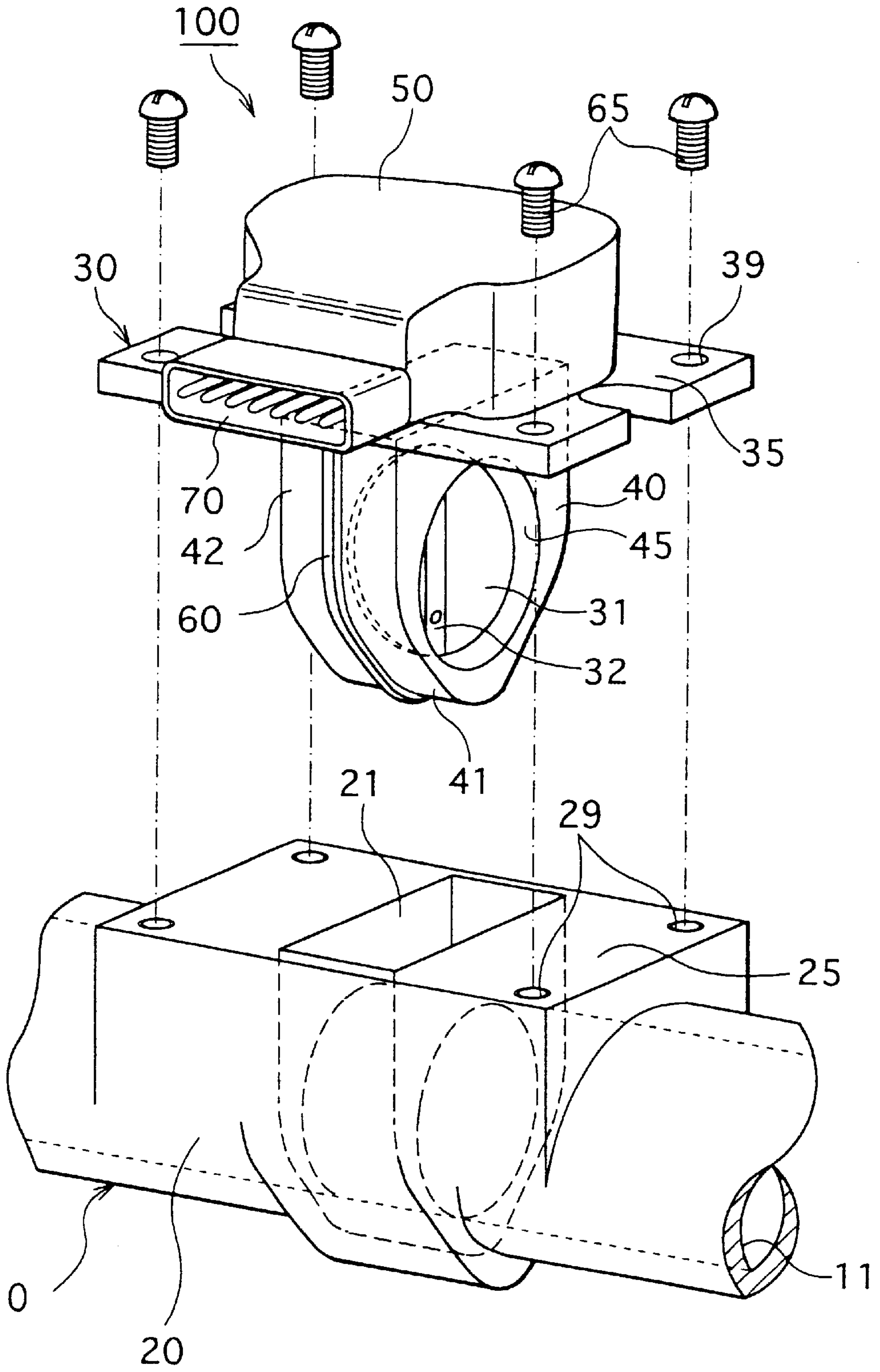
FIG. 5 is a perspective view showing an intake air passage body and a throttle assembly (second embodiment)

In the second embodiment, as shown in FIG. 5, an intake air controller 100 is used for an internal combustion engine, and includes an intake air passage body 20 and a throttle assembly 30. The intake air passage body 20 is formed within an intake air passage block 10 including an air passage 11. The intake air passage body 20 is made of resin, and the throttle assembly 30 is attached to the intake air passage body 20.

The bore wall 40 has a large thickness in the air flow direction in comparison with the bore wall 40 in the first embodiment, and is substantially formed in pentagon surrounding the bore inner wall 45 in cross section perpendicular to the air flow direction. That is, a bottom end 41 of the bore wall 40 in the second embodiment is not cylindrically formed.

The intake air passage body 20 includes a slit-like slot 21 perpendicularly formed to an air-flow direction in the air passage 11, into which the bore wall 40 and the bottom end 41 thereof is installed.

Figure 6:
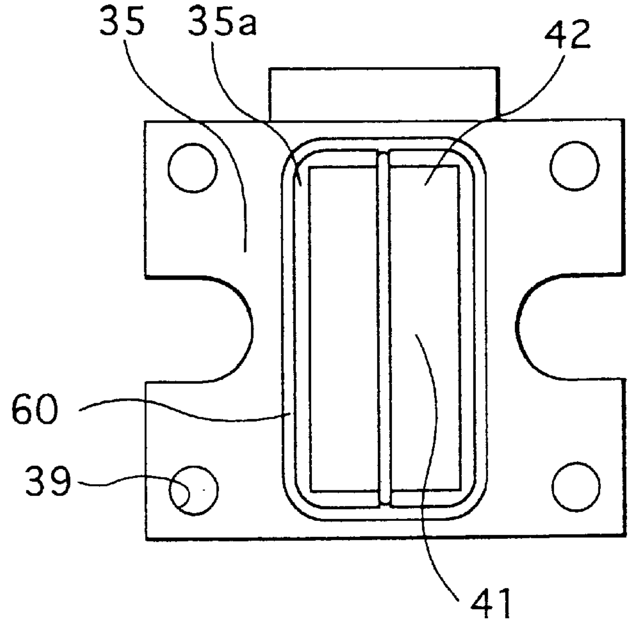
FIG. 6 is a bottom view showing the throttle assembly (second embodiment)

Therefore, as shown in FIGS. 5 and 6, the shape of single rubber seal member 60 provided at the bottom end 41, the side wall 42, and the root portion 35*a* of the flange 35 is simplified.

As in the first embodiment, the screws 65 fix the flange 35 of the throttle assembly 30 to the flange 25 of the intake air passage body 20 through the screw holes 29, 39. Thus, a bore inner wall 45 of the bore wall 40 is placed to correspond to the inner wall of the intake air passage 11, and the seal member 60 completely seals between the intake air passage body 20 and the throttle assembly 30.

After that, the electric motor and the throttle position sensor are electrically connected to an outside control unit through a connector 70 and a wire harness. The intake air amount into the engine is adjusted based on the opening position of the throttle valve 31 with respect to the bore inner wall 45.

As described above, the bore wall 40 to which the seal member 60 is previously attached is inserted into the slit-like slot 21. That is, the throttle assembly 30 including the seal member 60 is inserted into the slit-like slot 21 perpendicularly to the air-flow direction in the intake air passage 11, so that the throttle assembly 30 is easily attached to the intake air passage body 20, and a sealing mechanism therebetween is simplified as in the first embodiment.

(Third Embodiment)

Figure 7:
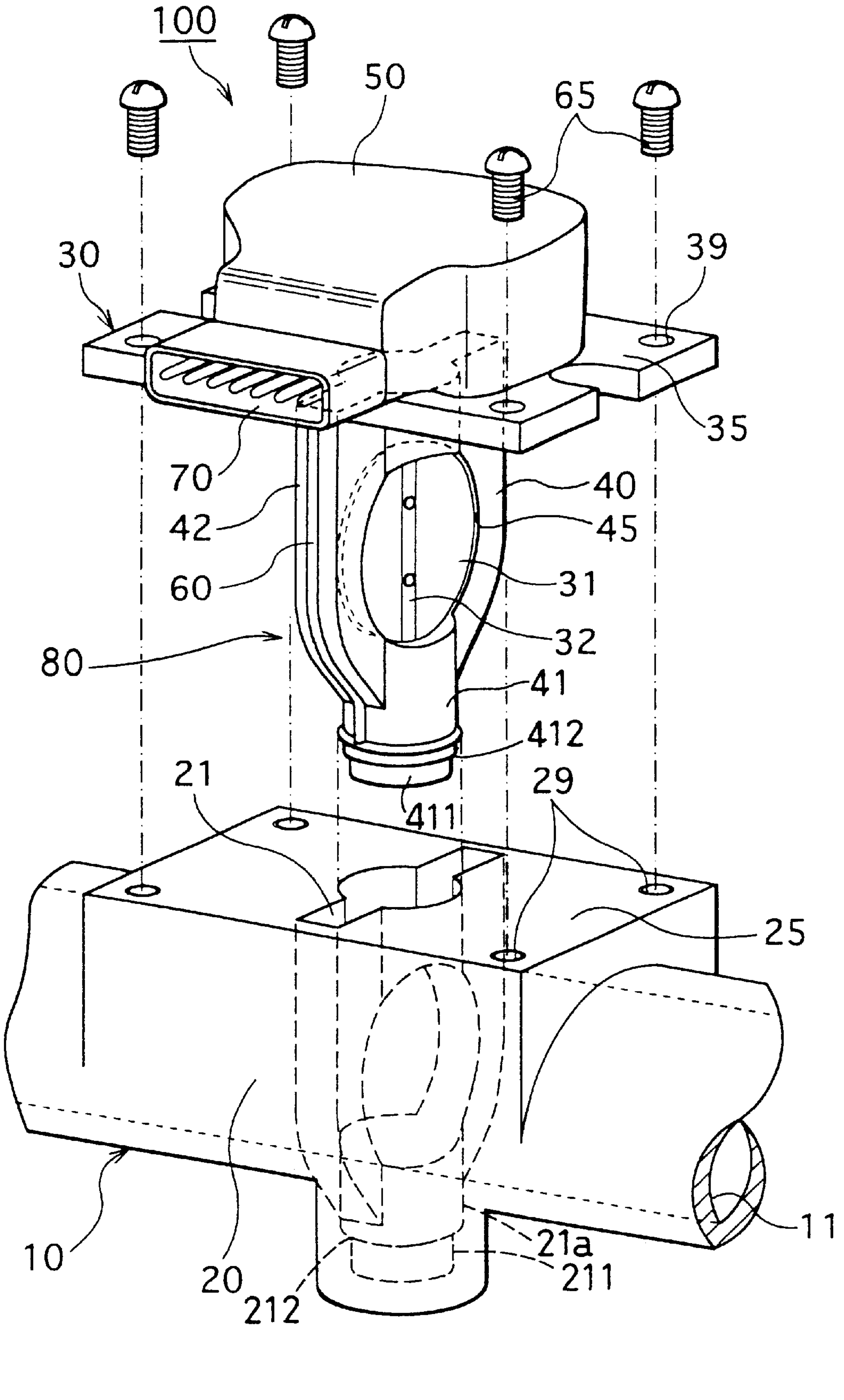
FIG. 7 is a perspective view showing an intake air passage body and a throttle assembly (third embodiment)

In the third embodiment, as shown in FIG. 7, a cylindrical insertion portion 411 is formed at the bottom of the cylindrical portion 41 in the first embodiment. The diameter of the insertion portion 411 is smaller than that of the cylindrical portion 41, so that a step 412 is formed at the bottom surface of the cylindrical portion 41. An insertion hole 211 is formed at the bottom of the cylindrical hole 21*a.* The diameter of the insertion hole 211 is smaller than that of the cylindrical hole 21*a,* so that a step 212 is formed at the bottom surface of the cylindrical hole 21*a*.

When the bore wall 40 is inserted into the key-like slot 21, the insertion portion 411 is fit or press-inserted into the insertion hole 211, and the step 412 engages with the step 212.

According to the first embodiment, since the elastic seal member 60 is provided with the cylindrical portion 41, the axis of the cylindrical portion 41 may incline with respect to the axis of the cylindrical hole 21*a* when the bore wall 40 is inserted into the key-like slot 21. Under such a condition, it is difficult to maintain the accuracy of clearance between the outer wall of the bore wall 40 and the inner wall of the key-like slot 21. If the clearance becomes over an allowable amount, the seal member 60 may not sufficiently seal between the intake air passage body 20 and the throttle assembly 20.

Further, even when the clearance accuracy is maintained, since the seal member 60 is made of elastic rubber, the bore wall 40 may vibrate in the key-like slot 21 due to an engine vibration. When the bore wall 40 vibrates, the throttle valve 31 is not appropriately located with respect to the air passage 11, so that the intake air flow amount is not well controlled.

However, according to the third embodiment, since the additional insertion portion 412 is installed into the insertion hole 211 while no seal member 60 is provided therebetween, the bore wall 40 is correctly placed against the key-like slot 21. That is, the axis of the cylindrical portion 41 is made to correspond to the axis of the cylindrical hole 21*a*.

Thus, the clearance between the outer wall of the bore wall 40 and the inner wall of the key-like slot 21 is constantly maintained, so that the sealing performance of the seal member 60 is highly attained. The insertion portion 412 is firmly supported by the insertion hole 211, thereby preventing the bore wall 40 from vibrating due to the engine vibration.

Further, the insertion hole 211 is formed at the bottom of the cylindrical hole 21*a* to hold the front end area of the insertion portion 411 in an insertion direction. Thus, it is not necessary to change the opening shape of the key-like slot 21.

(Fourth Embodiment)

Figure 8:
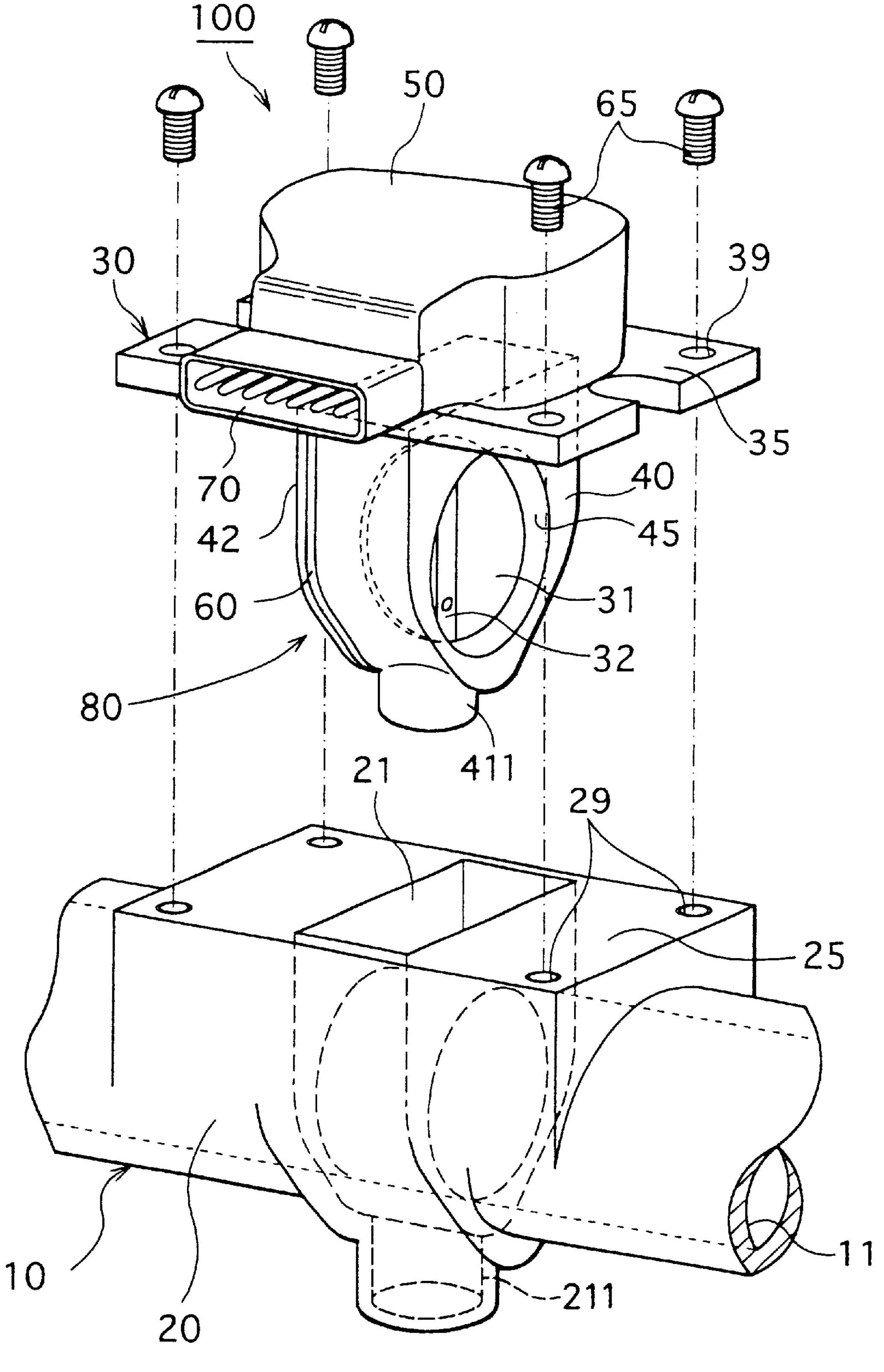
FIG. 8 is a perspective view showing an intake air passage body and a throttle assembly (fourth embodiment)
Figure 9:
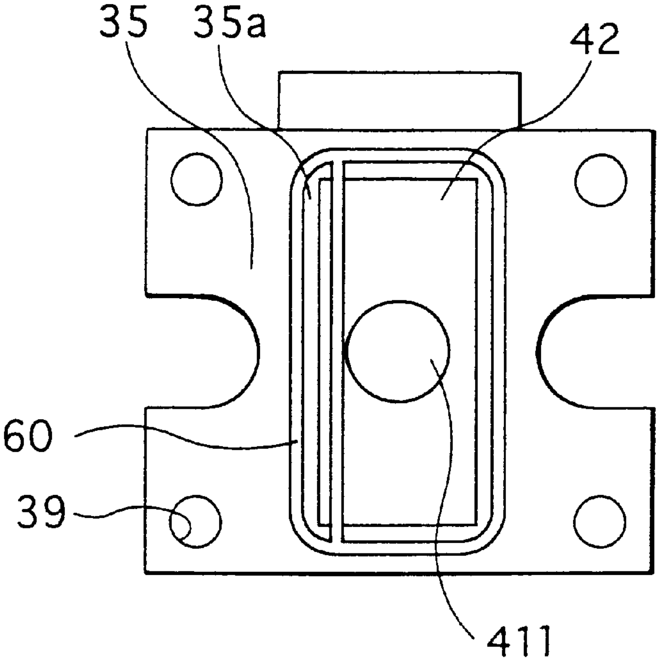
FIG. 9 is a bottom view showing the throttle assembly (forth embodiment)

In the fourth embodiment, as shown in FIGS. 8 and 9, an additional insertion portion 411 and an additional insertion hole 211 are provided with the second embodiment. As in the fourth embodiment, the insertion portion 411 is fit or press inserted into the insertion hole 211 while no elastic seal member is provided therebetween.

Here, as shown in FIG. 9, the seal member 60 located on the bottom surface of the bore wall 40 avoids the cylindrical insertion portion 411 such that the insertion portion 411 directly contacts the insertion hole 211.

(Fifth Embodiment)

Figure 11:
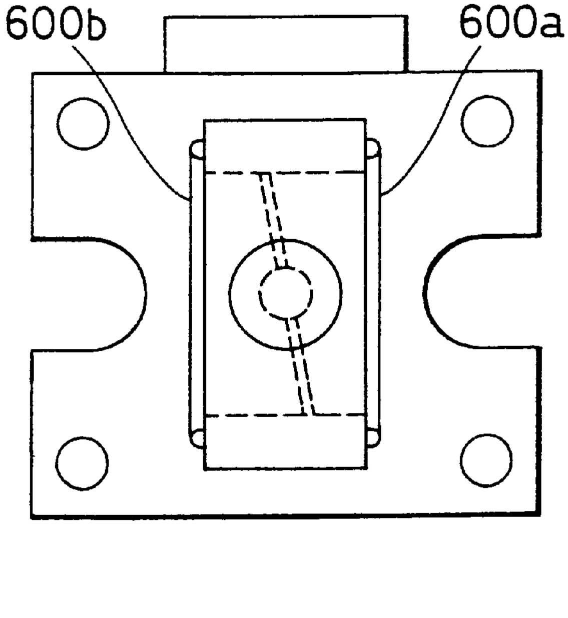
FIG. 11 is a bottom view showing the throttle assembly (fifth embodiment).
Figure 10:
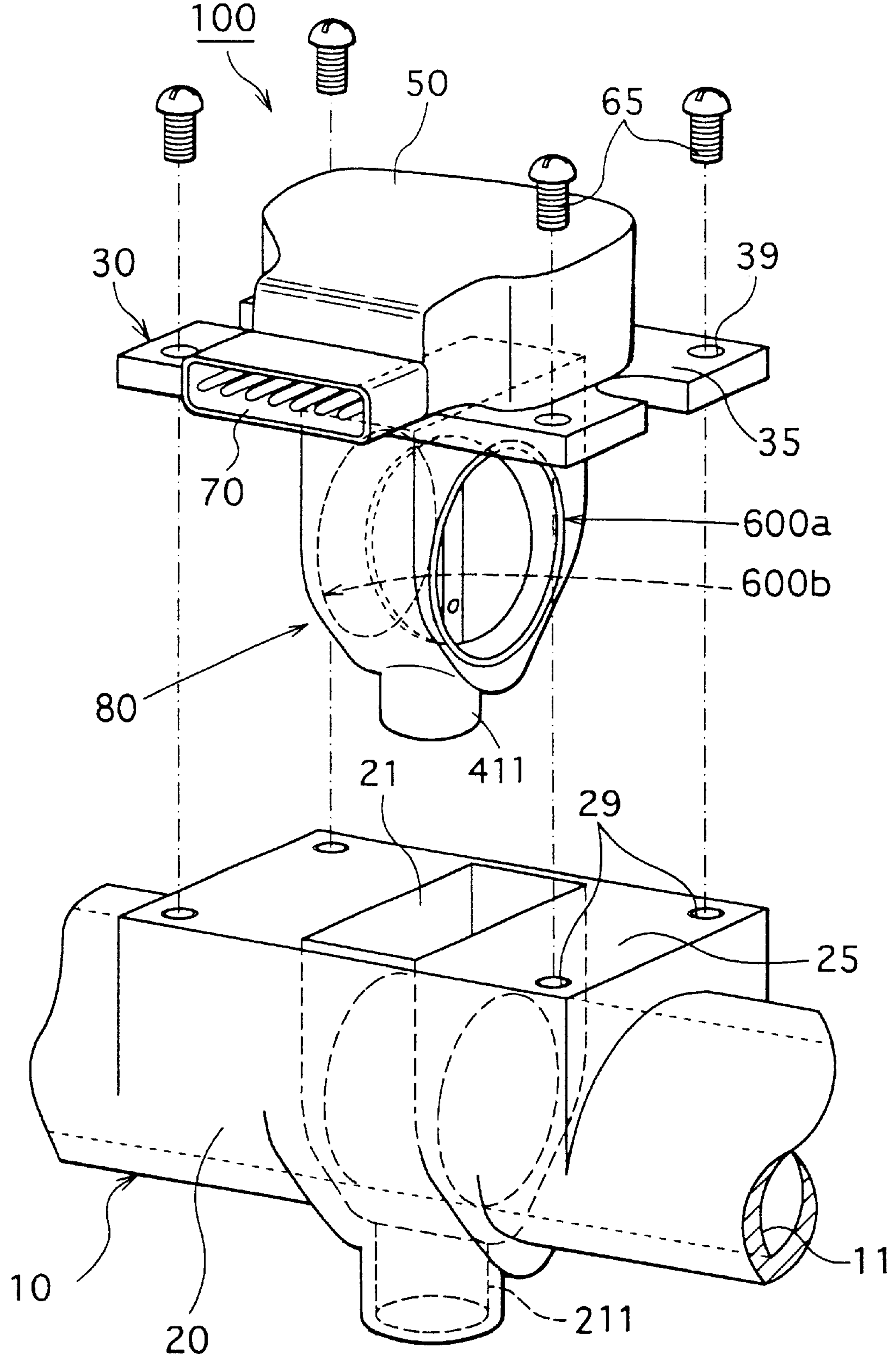
FIG. 10 is a perspective view showing an intake air passage body and a throttle assembly (fifth embodiment)

In the fifth embodiment, as shown in FIGS. 10 and 11, ring-like gaskets 600*a* and 600*b* are provided on the front and rear walls of the bore wall 41 respectively, to surround the air intake bore instead of the seal member 60 in the fourth embodiment.

(Modifications)

In the above-described embodiments, the electric motor is used to drive the throttle valve 31. Alternatively, a link throttle mechanism may drive a throttle valve directly based on an accelerate stroke.

What is claimed is:

1. An intake air controller for an internal combustion engine comprising:

a throttle assembly, said throttle assembly including a throttle valve adjusting an amount of air flowing into said internal combustion engine, a throttle body portion, a throttle shaft supporting said throttle valve with respect to said throttle body portion, a driving mechanism connected to said throttle shaft and driving said throttle valve, and a first flange;

an intake air passage body to which said throttle assembly is attached, said intake air passage body including an intake air passage leading the air into said internal combustion engine, a throttle body slot into which said throttle assembly is inserted as a single unit, and a second flange to which said first flange is fixed; and a seal member sealing between said throttle assembly and said intake air passage body perpendicularly to the flow direction of the air, wherein said throttle assembly further comprises a bottom end portion at a bottom side of said throttle body portion and an insertion portion, said bottom end portion and said insertion portion being integrated as a unit and said insertion portion having a transverse dimension less than a corresponding transverse dimension of said bottom end portion, said seal member extending along at least a circumferential periphery of the throttle assembly, said seal member being received within and being in engagement with said throttle body slot of said intake air passage body so as to define a peripheral, circumferential seal between said intake air passage and said throttle assembly, and said intake air passage body further comprises a holder portion receiving said bottom end portion, and an insertion hole into which said insertion portion is inserted, said insertion portion and said insertion hole having a corresponding size and shape for aligning the throttle assembly and the intake air passage body, said insertion portion being directly disposed in said insertion hole in the absence of a sealing member therebetween, whereby the insertion portion is provided solely as an alignment structure to square and center the throttle assembly within the air intake passage body through the throttle body slot during installation.

2. An intake air controller according to claim 1, wherein said insertion portion is press-inserted into said insertion hole.

3. An intake air controller according to claim 1, wherein said holder portion holds a front end area of said bottom end portion in an insertion direction thereof.

4. An intake air controller according to claim 1, wherein said insertion portion protrudes from a bottom side of said bottom end portion.

5. An intake air controller according to claim 1, wherein said bottom end portion is defined as a cylindrical portion at the bottom side of said throttle body portion, said insertion portion protrudes from a bottom end of said cylindrical portion, a diameter of said insertion portion is smaller than a diameter of said cylindrical portion, so that a first step is formed at the bottom end of said cylindrical portion, said holder portion of said intake air passage defines a cylindrical hole, said insertion hole is formed at a bottom end of said cylindrical hole, a diameter of said insertion hole is smaller than a diameter of said cylindrical hole, so that a second step is formed at the bottom end of said cylindrical hole, and when said insertion portion is inserted into said insertion hole, said first step engages with said second step.

6. An intake air controller according to claim 1, wherein said throttle valve is a butterfly type valve formed in a plate, said throttle body portion is formed in a plate having a thickness in the flow direction of the air such that said throttle valve is entirely placed within said throttle body portion when said throttle valve is at a closed position thereof.

7. A method for assembling an intake air controller for an internal combustion engine, said intake air controller having a throttle assembly including a throttle valve adjusting an amount of air flowing into said internal combustion engine, a throttle body portion, a throttle shaft supporting said throttle valve with respect to said throttle body portion, a driving mechanism connected to said throttle shaft and driving said throttle valve, a first flange, a bottom end portion at a bottom side of said throttle body portion, and an insertion portion, said bottom end portion and said insertion portion being integrated as a unit and said insertion portion having a transverse dimension less than a corresponding transverse dimension of said bottom end portion, said intake air controller having an intake air passage body to which said throttle assembly is attached, said intake air passage body including an intake air passage leading the air into said internal combustion engine, a throttle body slot into which said throttle assembly is inserted as a single unit perpendicularly to a flow direction of the air, a second flange to which said first flange is fixed, a holder portion for holding said bottom end portion, and an insertion hole for receiving said insertion portion, said insertion portion and said insertion hole having a corresponding size and shape for aligning the throttle assembly and the intake air passage body, and said intake air controller having a seal member sealing between said throttle assembly and said intake air passage body perpendicularly to the flow direction of the air, the method comprising:

attaching said seal member to said throttle assembly, said seal member extending along at least a circumferential periphery of the throttle assembly;

inserting said insertion portion into said insertion hole without a seal member therebetween while inserting said throttle assembly into said throttle body slot of said intake air passage body to thereby align said throttle assembly and said intake air passage body so that said bottom end portion is received and held by said holding portion, wherein the insertion portion is used solely as an alignment structure to square and center the throttle assembly within the air intake passage body through the throttle body slot during installation, and wherein said seal member is received within and is in engagement with said throttle body slot of said intake air passage body so as to define a peripheral, circumferential seal between said intake air passage and said throttle assembly; and fixing said first flange to said second flange while providing said seal member between said throttle assembly and said intake air passage body.

* * * * *